United States Patent [19]

Oh

[11] Patent Number: 5,061,134

[45] Date of Patent: Oct. 29, 1991

[54] DIVIDED BOLT FASTENING DEVICE

[76] Inventor: Jung H. Oh, 91-265, Shinsu-dong, Napo-ku, Seoul, Rep. of Korea

[21] Appl. No.: 544,738

[22] Filed: Jun. 27, 1990

[51] Int. Cl.$^5$ .................... F16B 21/00; F16B 35/02
[52] U.S. Cl. .................... 411/385; 411/344; 411/361
[58] Field of Search ............ 411/383, 385, 386, 340, 411/344, 345

[56] References Cited

U.S. PATENT DOCUMENTS

| | | | |
|---|---|---|---|
| 1,111,657 | 9/1914 | Kohler | 411/385 |
| 1,521,024 | 12/1924 | Hubener | 411/344 |
| 2,043,861 | 6/1936 | Neal | 411/385 |
| 2,084,952 | 6/1937 | Field | 411/385 |
| 2,836,095 | 5/1958 | Devine | 411/385 |

FOREIGN PATENT DOCUMENTS 692887  8/1964  Canada .................... 411/385

*Primary Examiner*—Neill R. Wilson
*Attorney, Agent, or Firm*—Jerry Cohen; Harvey Kaye

[57] ABSTRACT

A fastener comprised of longitudinally divided bolt pieces (1,2,3) inserted into the hole, with trailing tips of the bolt pieces connected to a string (5), which is pulled out of a hole into which the bolt pieces are inserted so that the divided bolt pieces are recoupled, with head portions of the divided bolt pieces halted at the other side of the hole. The forwardly exposed shank of the recoupled bolt is fastened by means of a nut or by applying a riveting.

5 Claims, 3 Drawing Sheets

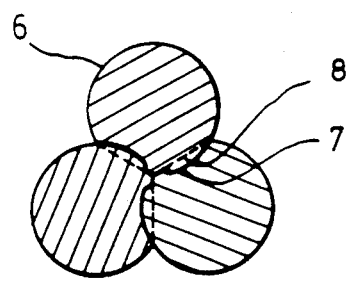
FIG.3.A
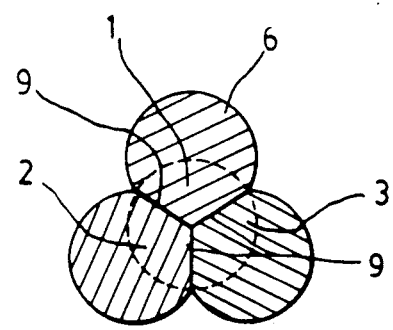
FIG.3.B
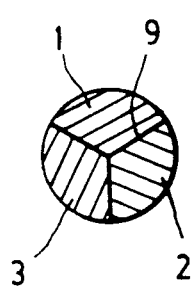
FIG.3.C
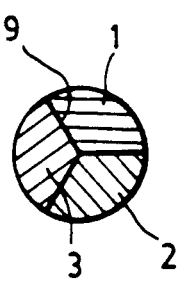
FIG.3.D
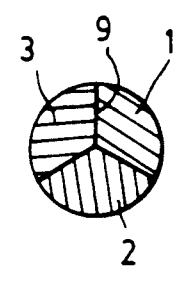
FIG.3.E
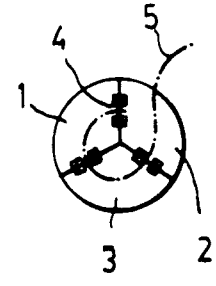
FIG.3.F
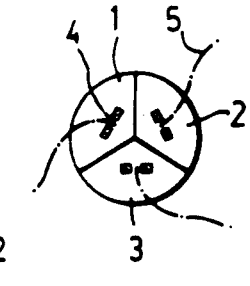
FIG.3.G
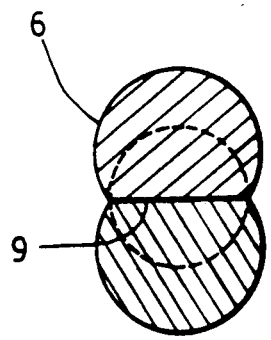
FIG.4
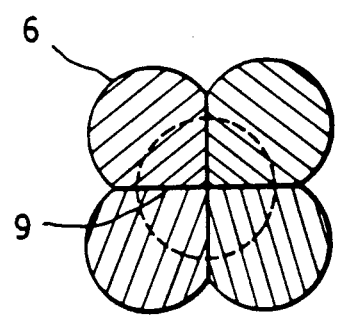
FIG.5

DIVIDED BOLT FASTENING DEVICE

FIELD OF THE INVENTION

The present invention relates to a fastening device using divided bolt pieces for fastening any item to a closed plate through a hole formed therein where the plate does not allow access to its distal (rear) side.

BACKGROUND OF THE INVENTION

Generally ordinary bolts and nuts can be easily used for fastening ordinary structures where access is available to both sides. In such a case, the bolt can be inserted easily from the other side of a plate or other structure. However, in the case where the other side of the structure is hidden or closed to bar access for the hands of people or tools to the other side, it is impossible to fasten an item to the structure with ordinary means.

Korean Patent Publication No. 90-221 which is granted to the present Applicant discloses a solution to the above problem, in which a circular washer is divided into two pieces or into a plurality of pieces, and each of the pieces is connected to two pulling strings. The divided pieces are inserted one by one into a fastening hole, and then the strings are pulled out, so that the divided pieces are assembled into a circular washer at the other side of the fastening hole. In practice, the head portion of a bolt is inserted into the fastening hole, and then the strings are pulled out to assemble the divided washer at the other side of the hole, and to make the assembled washer to support the head of the bolt. However, in this prior device, while it is convenient to insert the divided washer pieces into the fastening hole one by one, there is the limitation that the fastening hole has to be larger than the head of the bolt if a fastening is to be carried out. Further, a divided washer is necessarily involved.

There is another related device disclosed in U.S. patent application Ser. No. 303,354, and in the device of the present invention in which a pulling string is attached to the lower portion of a bolt, while pieces of an elongate oval washer divided into narrow pieces are inserted into a fastening hole one by one. Then the pulling string is pulled out so that the assembled washer supports the head of the bolt. Then a nut is fastened to the forwardly projected tip of the bolt, and therefore, this device also requires the condition that the fastening hole is larger than the head of the bolt. It is a principal object of the present invention to overcome the above described limitations of conventional devices.

It is a further object of the invention to provide a fastening device in which the head of a bolt as large as a washer is supported directly at the distal side of a fastening hole.

It is a further object of the invention to enable a hole in the structure not substantially larger than the device's minimum cross section.

Further objects of the invention are to provide a fastening device in which tightening can be carried out with a collar instead of a nut by providing a locking groove, or a riveting can be used by bending the tip of the bolt.

SUMMARY OF THE INVENTION

In achieving the above objects, the fastening device of the present invention is constructed such that, in order to fasten an item to a forward face a closed wall or plate without rearward access, a bolt is provided which is divided in the longitudinal direction into two pieces or a greater plurality of pieces. The tip of each of the divided pieces is connected to a pulling string in a parallel or serial form. The divided pieces of the bolt are inserted into the fastening hole one by one, with the head portion as the leading end. After insertion of the divided pieces of the bolt, the pulling string is pulled out. The divided bolt pieces are assembled into a bolt, and the head portion of the bolt is halted at the rear side of the plate (i.e., at the other side of the fastening hole), while the tip of the bolt projects through the front. Then the bolt can be tightened by means of a nut or can be riveted by bending the tops of the divided pieces of the bolt.

Other objects, features, and advantages will be apparent from the following detailed description of preferred embodiments taken in conjunction with the accompanying drawing in which:

BRIEF DESCRIPTION OF THE DRAWING

FIG. 3A is a cross-sectional view taken along the line A—A of FIG. 2;

FIG. 3B is a cross-sectional view taken along the line B—B of FIG. 2;

FIG. 3C is a cross-sectional view taken along the line C—C of FIG. 2;

FIG. 3D is a cross-sectional view taken along the D—D of FIG. 2;

FIG. 3E is a cross-sectional view taken along the line E—E of FIG. 2;

FIGS. 3F and 3G are cross-sectional views taken along the line F—F of FIG. 2;

FIG. 4 is a sectional view showing the head of a bolt divided into two pieces according to another preferred embodiment of the present invention;

FIG. 5 is a cross-sectional view showing the head of a bolt divided into four pieces according to another preferred embodiment of the present invention;

DETAILED DESCRIPTION OF PREFERRED EMBODIMENTS

Figure 1:
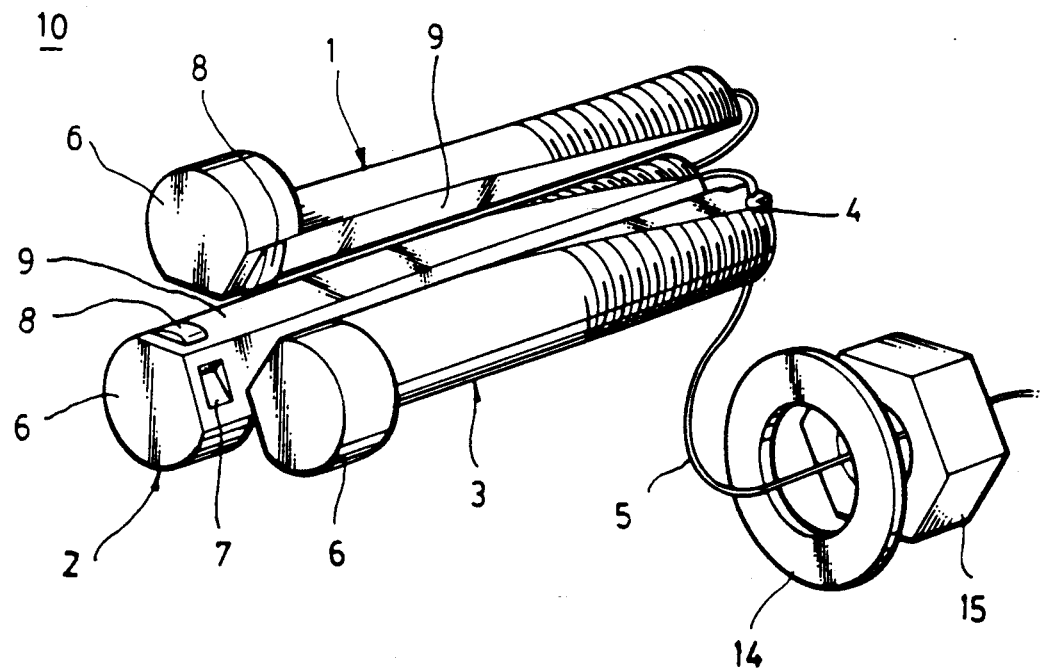
FIG. 1 is an exploded isometric view of the device according to a first preferred embodiment of the present invention.

FIG. 1 is an exploded isometric view of the fastening device according to a preferred embodiment of the present invention. The bolt 10 consists of three divided pieces 1, 2, 3, and the tips of the tails of the divided pieces are provided with holes 4 respectively, through which a pulling string is passed.

The divided bolt pieces 1, 2, 3 have head portions 6 and on the divided faces of them, there are respectively formed depressions 7 and projections 8. These depressions and projections serve the function of being coupled together upon assembling of the divided bolt pieces in order the prevent the slipping of any one of the pieces from the remaining ones.

Further, the divided faces of the bolt pieces are preferrably not formed straight, but are formed in a twisted contour so that when the divided pieces are assembled into a bolt, the pieces do not slip from each other. This arrangement also increases the tensile strength of the bolt.

Figure 2:
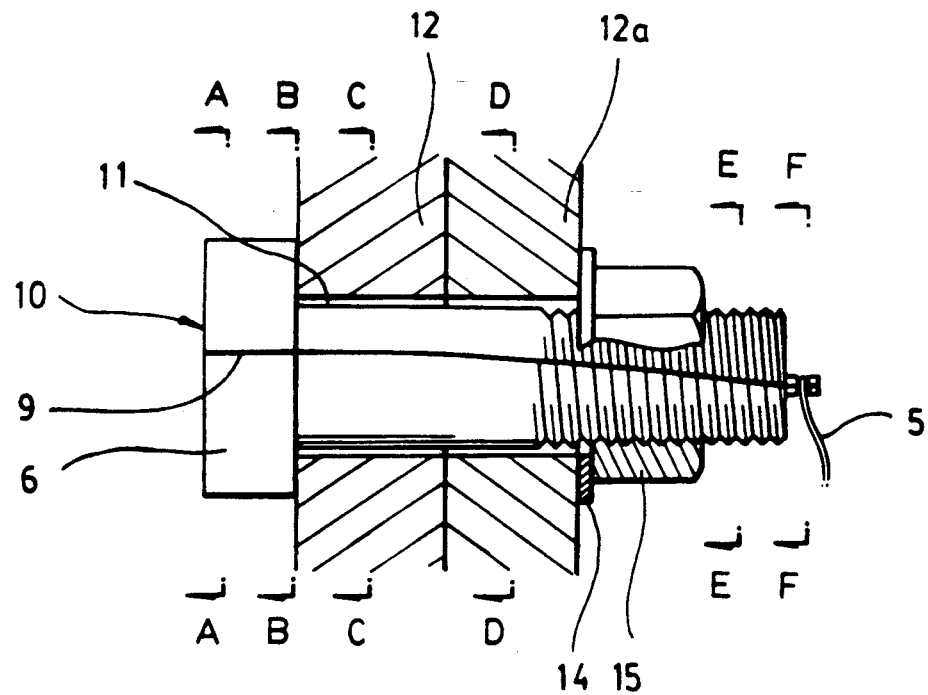
FIG. 2 is a longitudinal-section view showing the application of FIG. 1 device.

The pulling string 5 connecting the tips of the divided bolt pieces is preferrably made of a nylon string or a metal strap which is convenient in pulling out the inserted bolt pieces and recoupling the pieces 1, 2, 3 which are inserted into a fastening hole 11 of a closed wall and the like as shown in FIG. 2.

If the string holes 4 of the tips of the divided pieces have a rectangular shape, then a pulling string 4 in the form of a steel strap preferably is used so that the divided pieces can be recoupled at the exact position as shown in FIG. 2. Therefore, particularly, if the closed wall is very thick, the head portions of the divided pieces can be easily assembled and halted at the other side of the wall. Further, the pulling string 5 may be connected to the divided pieces in separate strings, or a single string may connect all the pieces serially.

FIG. 2 shows an application of the fastening device of FIG. 1, and the application is done in such a manner that the fastening device is inserted into fastening holes 11, 11A of panels 12, 12A. Then the pulling string 5 is pulled out to recouple the inserted pieces and then the exposed thread section 13 of the bolt is tightened with a washer 14 and a nut 15. Here, the divided bolt pieces take a twisted form.

FIG. 3A, a cross-sectional view taken along the line A—A of FIG. 2, shows depressions 7 and projections 8 which are formed on the faces of the divided head portions and are coupled to each other so that the divided bolt pieces 1, 2, 3 do not slip from each other. The area of each of the divided head portions is almost the same as the combined bolt shank and therefore, the head portions can be easily inserted into the fastening holes 11, 11A.

FIG. 3B, a cross-sectional view taken along the line B—B of FIG. 2, has hatched portions which indicate the head portions 6 of the divided bolt pieces, and the dotted circle indicates the shank of the bolt. If a large bolt head is required, the bolt can be divided into four pieces in the longitudinal direction, but there will be rarely encountered a case in which more than four divisions are required. FIGS. 3C, 3D and 3E are cross-sectional views taken along the lines C—C, D—D and E—E of FIG. 2, respectively, and show that the divided bolts are twisted in the clockwise direction. In the case where the length of the bolt is long, the twisting may be formed to one round complete 360° turn) or more. FIG. 3F, a cross-sectional view taken along the line F—F of FIG. 2, shows a single pulling string 5 connected through the holes 4 of the tips of the bolt pieces. FIG. 3G, a cross-sectional view taken along the line F—F of FIG. 2, shows separate strings 5 connected to the respective holes of the bolt pieces.

Figure 6:
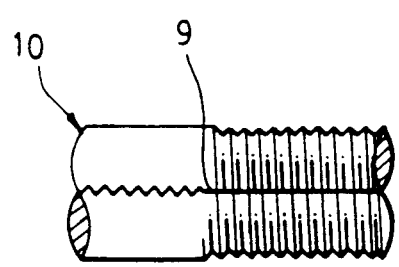
FIG. 6 shows a coupling of a divided bolt with the division boundary forming a teeth-shaped surface.
Figure 7:
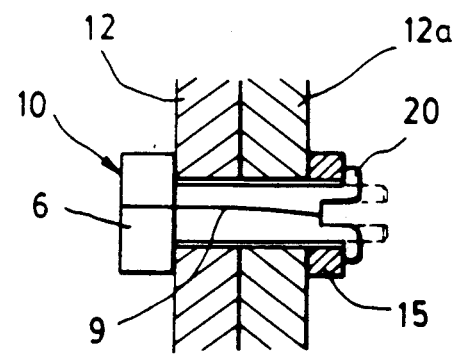
FIG. 7 shows the fastening of the bolt in the form of a riveting.
Figure 8:
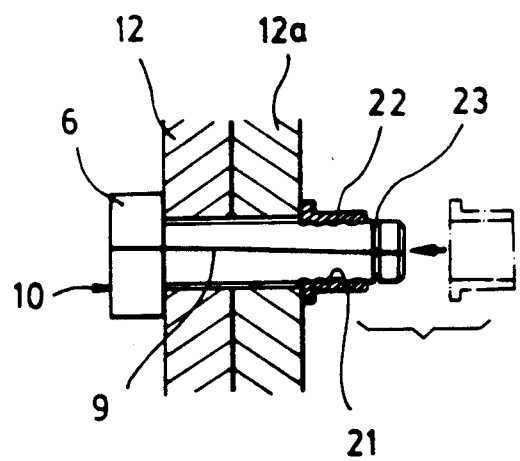
FIG. 8 shows the fastening of the bolt with a collar.

FIG. 4 is a plan view of the head portions of a bolt which is divided into two pieces. FIG. illustrates a bolt divided into four pieces. FIG. 6 illustrates a teeth-shaped division boundary, and this teeth-shaped division boundary should be preferably formed avoiding the thread portion of the bolt. FIGS. 7 and 8 illustrate another example of the application of the fastening device according to the present invention. FIG. 7 illustrates the formation of a terminal annular projection 20 by carrying out a riveting to the bolt, while FIG. 8 illustrates the formation of fastening grooves 21 to the end portion of the bolt in order to fit a collar 22 to carry out a permanent tightening. The grooves 21 have the effect of keeping the collar from being detached unlike the case of the nut 15, and there may be formed on the end portion of the bolt a shearing groove which allows shearing of the bolt upon applying a shearing force.

Figure 9:
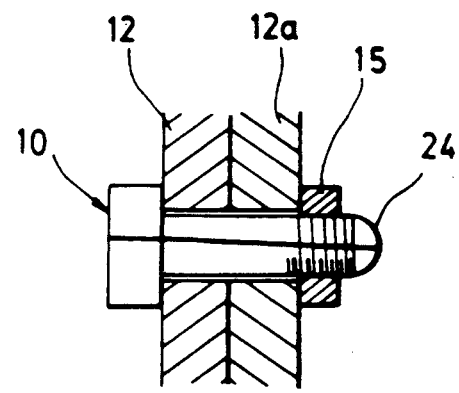
FIG. 9 shows the bolt with its tip having the shape of a dome.

FIG. 9 illustrates the formation of a curved bullet-shaped end portion 24 of the bolt, and this curved portion facilitates the passingthrough of the divided bolt pieces upon pulling of the pulling string through the fastening holes 11, 11A.

Thus, the present invention allows fastening an item using a hole formed in a wall or a closed plate. The fastening can be made by using divided bolt pieces without using divided washer pieces. Further, the fastening hole may be formed in a smaller size compared with the conventional devices, and the tightening can be done in diversified forms by using a nut, a collar or a rivet, thereby expanding the application fields. Further, the bolt is divided into multiple pieces (e.g., three) with a twisting being provided, and therefore, the fastener can withstand a heavy load.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A fastening device for fastening an item through a hole formed into a rearwardly closed structure, comprising:
    (a) means defining a bolt longitudinally divided into two or more pieces with head and shank portions for insertion through said hole from the forward side one by one;
    (b) means defining at least one pulling string and holes formed in said divided bolt pieces in a parallel or serial form for receiving such string, the holes allowing for pulling out the inserted bolt pieces from said hole in order to recouple them into a bolt with head and shank;
    (c) said structure being constructed such that the head portions of said pieces are halted at the other side of said hole; and
    (d) said divided faces being provided with a twisting.

2. The fastening device of claim 1 and further comprising a nut for tightening the bolt shank of the assembled bolt after it is pulled out from said hole.

3. The fastening device of claim 1, wherein coupling surfaces are formed on the divided boundary of said bolt pieces, so that the coupled bolt pieces should fit each other, and do not slip relative to each other.

4. The fastening device of claim 3 wherein the coupling surfaces comprise tooth shapes.

5. The fastening device of claim 1 wherein the tip portion of said bolt is provided with a cylindrical recess, so that the bolt can be fastened by performing a riveting operation.

* * * * *